United States Patent
Inoue et al.

(10) Patent No.: US 9,735,938 B2
(45) Date of Patent: Aug. 15, 2017

(54) PILOT SIGNAL TRANSMISSION METHOD AND RADIO COMMUNICATION APPARATUS

(71) Applicant: NEC CORPORATION, Tokyo (JP)

(72) Inventors: Takamichi Inoue, Tokyo (JP); Yoshikazu Kakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/075,346

(22) Filed: Mar. 21, 2016

(65) Prior Publication Data
US 2016/0204911 A1    Jul. 14, 2016

Related U.S. Application Data

(63) Continuation of application No. 14/593,753, filed on Jan. 9, 2015, now Pat. No. 9,392,492, which is a (Continued)

(30) Foreign Application Priority Data

Apr. 25, 2006 (JP) .................................. 2006-120432

(51) Int. Cl.
H04L 5/00     (2006.01)
H04W 28/20    (2009.01)
(Continued)

(52) U.S. Cl.
CPC .......... H04L 5/005 (2013.01); H04J 13/0077 (2013.01); H04L 5/0048 (2013.01);
(Continued)

(58) Field of Classification Search
CPC ........ H04B 2201/70701; H04J 13/0059; H04J 13/0077; H04L 27/2613; H04L 5/0007; H04L 5/0048; H04W 28/20
(Continued)

(56) References Cited

U.S. PATENT DOCUMENTS 5,544,155 A * 8/1996 Lucas ............... H04B 1/70755
                                              370/203
5,867,478 A * 2/1999 Baum ...................... H04L 1/06
                                              370/203
(Continued)

FOREIGN PATENT DOCUMENTS

CN    1234661 A    11/1999
CN    1475066 A    2/2004
(Continued)

OTHER PUBLICATIONS

Texas Instruments, "On Uplink Pilot in EUTRA SC-FDMA," 3GPP TSG RAN WG1 Ad Hoc on LTE, R1-051062, Oct. 10, 2005-Oct. 14, 2005, San Diego, USA.
(Continued)

*Primary Examiner* — Chi H Pham
*Assistant Examiner* — Robert Lopata
(74) *Attorney, Agent, or Firm* — Sughrue Mion, PLLC

(57) ABSTRACT

In a radio communication system, transmission of CAZAC sequences as the pilot signal sequences by using code division multiplexing as at least one of user multiplexing schemes, is done by dividing a system band as a frequency band usable in the system into frequency blocks B1 and B2 having bandwidths W1 and W2, generating the pilot signals of the frequency blocks B1 and B2 with a single carrier, using the pilot signal sequences having sequence lengths L1 and L2 corresponding to frequency blocks B1 and B2 respectively; and, transmitting the generated pilot signals as the pilot signals corresponding individual users, with multicarriers using an arbitrary number of frequency blocks among the plural frequency blocks.

12 Claims, 15 Drawing Sheets

Related U.S. Application Data continuation of application No. 13/352,968, filed on Jan. 18, 2012, now Pat. No. 8,964,717, which is a continuation of application No. 12/298,098, filed as application No. PCT/JP2007/051051 on Jan. 24, 2007, now Pat. No. 8,121,105.

(51) Int. Cl.
   *H04L 27/26* (2006.01)
   *H04J 13/00* (2011.01)

(52) U.S. Cl.
   CPC ......... *H04L 27/2613* (2013.01); *H04W 28/20* (2013.01); *H04B 2201/70701* (2013.01); *H04J 13/0059* (2013.01); *H04L 5/0007* (2013.01)

(58) Field of Classification Search
   USPC .......................................................... 370/343
   See application file for complete search history.

(56) References Cited

U.S. PATENT DOCUMENTS

| | | | |
|---|---|---|---|
| 5,991,330 A | 11/1999 | Dahlman et al. | |
| 6,917,580 B2* | 7/2005 | Wang | H04L 5/0032 370/203 |
| 6,987,746 B1* | 1/2006 | Song | H04W 56/0085 370/335 |
| 7,010,022 B2* | 3/2006 | Sousa | H04B 1/7085 375/149 |
| 7,236,554 B2* | 6/2007 | Gupta | H04L 5/06 375/343 |
| 7,366,089 B2* | 4/2008 | Tehrani | H04B 7/0848 370/208 |
| 7,623,569 B2* | 11/2009 | Chang | H04B 1/1027 375/227 |
| 7,672,221 B2* | 3/2010 | Fuji | H04L 25/0206 370/206 |
| 7,855,947 B2* | 12/2010 | Yun | H04L 5/0016 370/328 |
| 7,860,150 B2* | 12/2010 | Tiirola | H04B 1/7143 370/491 |
| 7,979,077 B2* | 7/2011 | Iwai | H04J 13/0062 455/450 |
| 8,040,854 B2* | 10/2011 | Furueda | H04B 7/0617 370/208 |
| 8,279,953 B2* | 10/2012 | Uesugi | H04L 5/0007 375/260 |
| 9,155,106 B2* | 10/2015 | Krishnan | H04W 74/004 |
| 2002/0131480 A1* | 9/2002 | Sousa | H04B 1/7085 375/147 |
| 2004/0091057 A1* | 5/2004 | Yoshida | H04L 25/03146 375/260 |
| 2005/0085236 A1 | 4/2005 | Gerlach et al. | |
| 2005/0152480 A1* | 7/2005 | Chang | H04B 1/1027 375/343 |
| 2005/0163265 A1 | 7/2005 | Gupta | |
| 2005/0265222 A1 | 12/2005 | Gerlach | |
| 2006/0222118 A1* | 10/2006 | Murthy | H03G 3/3068 375/345 |
| 2006/0291431 A1* | 12/2006 | Pajukoski | H04L 27/262 370/335 |
| 2007/0183386 A1* | 8/2007 | Muharemovic | H04L 5/023 370/344 |
| 2008/0020779 A1* | 1/2008 | Ode | H04L 1/0015 455/450 |
| 2008/0039098 A1* | 2/2008 | Papasakellariou | H04W 72/1231 455/442 |
| 2008/0123616 A1* | 5/2008 | Lee | H04L 5/0048 370/344 |
| 2008/0139237 A1* | 6/2008 | Papasakellariou | H04W 52/36 455/522 |
| 2008/0299984 A1* | 12/2008 | Shimomura | H04W 52/325 455/446 |
| 2009/0010219 A1* | 1/2009 | Lee | H04W 28/20 370/329 |
| 2009/0046787 A1* | 2/2009 | Uesugi | H04L 5/0007 375/260 |
| 2009/0052470 A1* | 2/2009 | Yun | H04L 5/0016 370/491 |
| 2009/0252112 A1* | 10/2009 | Shimomura | H04L 5/0007 370/330 |
| 2010/0111044 A1* | 5/2010 | Kawamura | H04B 1/7103 370/335 |
| 2011/0170509 A1* | 7/2011 | Naka | H04B 1/7083 370/329 |
| 2013/0003675 A1* | 1/2013 | Han | H04L 5/023 370/329 |
| 2014/0362818 A1* | 12/2014 | Onggosanusi | H04B 1/1615 370/329 |

FOREIGN PATENT DOCUMENTS

| | | |
|---|---|---|
| JP | 3200628 B2 | 6/2001 |
| JP | 2003-338775 A | 11/2003 |
| JP | 2004-253899 A | 9/2004 |
| JP | 2005-130491 A | 5/2005 |
| JP | 12005-328519 A | 11/2005 |
| WO | 2005011167 A1 | 2/2005 |
| WO | 2006026344 A1 | 3/2006 |
| WO | 2006109492 A1 | 10/2006 |

OTHER PUBLICATIONS

Branislav M. Popovic, "Generalized Chirp-Like Polyphase Sequences with Optimum Correlation Properties," IEEE Transactions on Information Theory, Jul. 1992, p. 1406-1409, vol. 38, No. 4.

Korean Office Action dated Sep. 14, 2010 corresponding to Korean application No. 10-2008-7028662.

International Search Report for PCT/JP2007/051051 dated Apr. 24, 2007.

Extended European Search Report dated Jun. 30, 2014, issued by the European Patent Office in corresponding European Application No. 07713693.5.

Panasonic, "Random access burst evaluation in E-UTRA uplink", Discussion, TSG-RAN WG1 Meeting#44bis, R1-060792, Mar. 27-31, 2006.

Fujitsu, "Considerations on CAZAC Reference-Signal for E-UTRA Uplink", Discussion, 3GPP TSG RAN WG1#44, R1-060564, Feb. 13-17, 2006.

NTT DOCOMO et al., "Orthogonal Pilot Channel Structure in E-UTRA Uplink", Discussion and Decision, 3GPP TSG-RAN WG1 LTE Ad Hoc Meeting, R1-060046, Jan. 23-25, 2006.

+10NTT DoCoMo, et al., "Physical Channels and Multiplexing in Evolved UTRA Uplink," 3GPP TSG RAN WG1 #42 on LTE, R1-050850, p. 1-14, Aug. 29, 2005-Sep. 2, 2005, London, UK.

NTT DoCoMo, et al., "Orthogonal Pilot Channel in the Same Node B in Evolved UTRA Uplink," TSG-RAN WG1 #42bis, R1-051142 (Original R1-050851), p. 1-9, Oct. 10, 2005-Oct. 14, 2005, San Diego, USA.

NTT DoCoMo, et al., "Orthogonal Pilot Channel Structure for E-UTRA Uplink," 3GPP TSG-RAN WG1 Meeting #44bis, R1-060784 (Original R1-060046), p. 1-10, Mar. 27, 2006-Mar. 31, 2006, Athens, Greece.

Texas Instruments, "On Allocation of Uplink Pilot Sub-Channels in EUTRA SC-FDMA," 3GPP TSG RAN WG1 Ad Hoc on LTE, R1-050822, Aug. 29, 2005-Sep. 2, 2005, London, UK.

NTT DoCoMo, et al., "Investigation on Pilot Channel Structure for Single-Carrier FDMA Radio Access in Evolved UTRA Uplink," 3GPP TSG RAN WG1 #42 on Lte, R1-050703, Aug. 29, 2005-Sep. 2, 2005, London UK.

3GPP, "3rd Generation Partnership Project; Technical Specification Group Radio Access Network; Physical Layer Aspects for Evolved UTRA (Release 7), 3GPP Tr 25.814 v1.2.2 (Mar. 2006)," 2005, p. 1-104.

(56) References Cited

OTHER PUBLICATIONS

Texas Instruments, "On Uplink Pilot in Eutra SC-FDMA", Discussion/Decision, 3GPP TSG RAN WG1 Ad Hoc on LTE, R1-051062, Oct. 10-14, 2005.

Communication dated Sep. 23, 2014, issued by the State Intellectual Property Office of the People's Republic of China in counterpart Application No. 201210323114.0.

Communication dated Apr. 17, 2015 from the State Intellectual Property Office of the People's Republic of China in counterpart application No. 201210323114.0.

* cited by examiner

US 9,735,938 B2

PILOT SIGNAL TRANSMISSION METHOD AND RADIO COMMUNICATION APPARATUS

CROSS-REFERENCE TO RELATED APPLICATIONS

This is a continuation of U.S. application Ser. No. 14/593,753, filed Jan. 9, 2015, which is a continuation of U.S. application Ser. No. 13/352,968, filed Jan. 18, 2012, now U.S. Pat. No. 8,964,717, which is a continuation of U.S. application Ser. No. 12/298,098, filed Oct. 22, 2008, now U.S. Pat. No. 8,121,105, which is based on 371 National Stage Application No. PCT/JP2007/051051 filed on Jan. 24, 2007, which claims priority from Japanese Patent Application No. 2006-120432 filed on Apr. 25, 2006, the disclosures of which are incorporated herein by reference in their entirety.

TECHNICAL FIELD

The present invention relates to a radio communication system, and in particular relates to a pilot signal transmission method and radio communication apparatus that transmit a pilot signal in the uplink.

BACKGROUND ART

Recently, Beyond 3G has been developed as the next-generation radio network which can establish seamless and safety connection between a plurality of radio communication systems including third generation mobile communications (3G), wireless LANs and fourth generation mobile communications (4G). As the uplink transmission scheme for the Beyond 3G, use of a single carrier transmission scheme is considered (e.g., see literature '3GPP, "TR25.814 v1.2.2" March 2006'(which will be referred to hereinbelow as literature 1)).

FIG. 1 is a diagram showing a configuration of a transmitter based on a single carrier transmission scheme described in literature 1.

The transmitter shown in FIG. 1 includes data transmitter 1101, pilot transmitter 1102, MUX portion 1103 for multiplexing these outputs.

Further, data transmitter 1101 includes DFT (Discrete Fourier Transformation) portion 1111, subcarrier mapping portion 1112, IFFT (Inverse Fast Fourier Transformation) portion 1113 and cyclic prefix adder 1114.

Data transmitter 1101 shown in FIG. 1 operates as follows:
First,
data made up of $$N_{Tx\_d} \quad \text{[Math 1]}$$

symbols,
is transformed into a frequency-domain signal by applying DFT at $$N_{Tx\_d} \quad \text{[Math 2]}$$

points to the data at DFT portion 1111. Then, in subcarrier mapping portion 1112 the frequency-domain signal is mapped onto sub-carriers (by inserting '0' into unused subcarriers
to form data of subcarriers amounting to $$N_{FFT\_d}. \quad \text{[Math 3]}$$

Then, the frequency-domain signal after the subcarrier mapping is
transformed into time-domain signal by applying IFFT at $$N_{FFT\_d} \quad \text{[Math 4]}$$

points to the data at IFFT 1113. Finally, in cyclic prefix adder 1114, the data is added with a cyclic prefix to be transmitted.

FIG. 2 is a diagram showing how a cyclic prefix is added in cyclic prefix adder 1114 shown in FIG. 1.

Cyclic prefix addition at cyclic prefix adder 1114 shown in FIG. 1 is to copy the rear part of the block to the front end of the block as shown in FIG. 2.

It should be noted that a cyclic prefix is inserted in order to efficiently perform frequency-domain equalization on the receiver side. The cyclic prefix length is preferably set so as not to exceed the maximum delay time of the delay path in the channel.

Next, a configuration of a typical receiver corresponding to the transmitter shown in FIG. 1 will be described.

FIG. 3 is a diagram showing a configuration of a typical receiver corresponding to the transmitter shown in FIG. 1.

The receiver shown in FIG. 3 includes: DeMUX portion 1301 for separating the signal transmitted from the transmitter shown in FIG. 1 into a data signal and a pilot signal; data receiver 1302; and pilot receiver 1303.

Further, data receiver 1302 is comprised of cyclic prefix remover 1311, FFT (Fast Fourier Transformation) portion 1312, subcarrier demapping portion 1313, frequency equalizer 1314, IDFT (Inverse Discrete Fourier Transformation) portion 1315 and data demodulator 1316.

Data receiver 1302 shown in FIG. 3 operates as follows:
First, at cyclic prefix remover 1311, the cyclic prefix is removed from the received signal. Then,
the data is transformed into a frequency signal by applying FFT at $$N_{FFT\_d} \quad \text{[Math 5]}$$

points in FFT portion 1312. Then, the signal is demapped into subcarriers used by each user at subcarrier demapping portion 1313. After demapping, the signal is subjected to frequency-domain equalization at frequency equalizer 1314, based on the channel estimate obtained by channel estimator 1324 (described later) of pilot signal receiver 1303. Then,
the signal is transformed into time-domain signal by applying IDFT at $$N_{Tx\_d} \quad \text{[Math 6]}$$

points in IDFT portion 1315, and then the received data is demodulated at data demodulator 1316.

Next, the uplink pilot signal and a user multiplexing method will be described.

Recently, as a pilot signal sequence, CAZAC (Constant Amplitude Zero Auto-Correlation) sequences have drawn attention. For example, as one of CAZAC sequences, the Zadoff-Chu sequence expressed by formula 1 can be considered (e.g., see a literature 'B. M. Povic, "Generalized Chirp-Like Polyphase Sequences with Optimum Correlation Properties," IEEE Transactions on Information Theory, Vol. 38, No. 4, pp 1406-1409, July 1992).

[Math 7]

$$c_k(n) = \begin{cases} \exp\left[\frac{j2\pi k}{L}\left(\frac{n^2}{2}+n\right)\right] & \text{when the sequence length } L \text{ is even} \\ \exp\left[\frac{j2\pi k}{L}\left(n\frac{n+1}{2}+n\right)\right] & \text{when the sequence length } L \text{ is odd} \end{cases} \quad \text{(Formula 1)}$$

$n: 0, 1, \ldots, L-1$
$k$: sequence number ($k$ is an integer that is relatively prime to $L$).

A CAZAC sequence is a sequence that has a constant amplitude in both time and frequency domains and produces self-correlation values of '0' other than when the phase difference is '0'. Since the sequence is constant in amplitude in the time domain, it is possible to suppress the PAPR (Peak to Average Power Ratio), and since the sequence is also constant in amplitude in the frequency domain, the sequence is suitable for channel estimation in the frequency domain. Further, since the sequence has an advantage of being suitable for timing detection of the received signal because it has perfect self-correlation characteristics, the sequence has drawn attention as a pilot sequence that is suitable for single carrier transmission, which is the access scheme for uplink of Beyond 3G.

As the user multiplexing method when CAZAC sequences are used as the pilot signal sequences for uplink, Code Division Multiplexing (CDM) has been proposed (e.g., see literature '3GPP, R1-051062, Texas Instruments" On Uplink Pilot in EUTRA SC-OFDMA", October 2005').

In CDM of the pilot signals, all the users use CAZAC sequences of an identical sequence length added with a cyclic shift unique to each user. If the cyclic shift time is taken to be equal to or longer than the expected maximum delay, the pilot signals of all the users under the multipath environment can be made orthogonal to one another. This is feasible based on the property that the self-correlation value of a CAZAC sequence constantly becomes '0' other than when the phase difference is '0'.

The transmitter and receiver of a pilot signal when the pilot signal undergoes CDM will be described with reference to FIGS. 1 and 3. Since the basic configuration and operation of pilot transmitter 1102 is the same as data transmitter 1101, the points different from data transmitter 1101 will be described.

To begin with, the numbers of points for DFT portion 1121 and for IFFT portion 1123 are $$N_{Tx\_p}, N_{FFT\_p}$$ [Math 8]

(in literature 1, these are defined as $$N_{Tx\_p} = N_{Tx\_d}/2, N_{FFT\_p} = N_{FFT\_d}/2).$$ [Math 9]

When user multiplexing of pilot signals is performed by CDM, in order to separate the users from each other at the receiver, cyclic shift portion 1124 performs a cyclic shift unique to the user. A cyclic shift is a shift whereby the pilot signal sequence is handled like a ring, and the pilot signal sequence is reentered from the last end into the front end as shown in FIG. 2. The amount of the cyclic shift for each user is preferably equal to or greater than the maximum delay of the delay path, or the cyclic prefix length. Finally, the cyclic prefix is added at cyclic prefix adder 1125, and the generated data signal and the pilot signal are time-multiplexed through MUX portion 1103 to be transmitted.

Next, pilot receiver 1303 will be described.

In pilot receiver 1303, the data signal and the pilot signal are separated from each other by DeMUX portion 1301, then the cyclic prefix is removed by cyclic prefix remover 1321. Then, the pilot signal
is subjected to FFT at $$N_{FFT\_p}$$ [Math 10]

points by FFT portion 1322, so as to be transformed into the pilot signal in the frequency domain. Then, subcarrier demapping is performed at subcarrier demapping portion 1323, thereafter, channel estimation is performed by channel estimator 1324. The channel estimate for each user is output to frequency equalizer 1314 of data receiver 1302.

When CAZAC sequences are used in a cellar system, the cross-correlation characteristic is also important. In view of inter-cell interference suppression, it is preferred that a group of sequences that yield small cross-correlation values are allotted as the pilot signal sequences for neighboring cells. The cross-correlation characteristics of a Zadoff-Chu sequence greatly depend on the individual sequence. For example, when the sequence length L of a Zadoff-Chu sequence includes a prime or a large prime, it presents excellent cross-correlation characteristics (a low cross-correlation value). On the other hand, when it is a composite number composed of small primes only, the cross-correlation greatly degrades (the cross-correlation value contains a large value). Specifically, the sequence length L of Zadoff-Chu sequences is a prime, the cross-correlation value between arbitrary Zadoff-Chu sequences is considered to be kept constant at $$(1/L)^{1/2}$$ [Math 11]

(see non-patent document 3, for example).

In Beyond 3G, it is assumed that the transmission bandwidths of data signals and control signals differ from one user to another. Accordingly, the pilot signal used for demodulation of the data signal and control signal differs in transmission bandwidth for every user, hence it is necessary to multiplex the plot signals of users different in transmission bandwidth.

FIG. 4 is a diagram showing one configurational example a conventional mobile radio system.

In the mobile radio system shown in FIG. 4, constituted of BS1001 as a base station and CL1000 as a service area formed by BS1001, a plurality of mobile stations MS1002-1005 for performing communications with the BS1001 are provided.

FIG. 5 is a diagram showing frequency blocks used by the users in the mobile radio system shown in FIG. 4 and one example of pilot signal sequences used for the individual users.

As shown in FIG. 5, when the data signal or control signal is transmitted with a single carrier using a frequency block having continuous frequencies, the pilot signal is also transmitted with a signal carrier using the same frequency block as that of the data signal or control signal.

In a case where CDM is used to multiplex the pilot signal, when, in FIG. 5 for example, the bandwidths of the signals transmitted by MS1002-1005 are 3 W, W, W and 2 W (W is a predetermined bandwidth), CAZAC sequences having a sequence length of 3 L, L, L and 2 L corresponding to respective bandwidths will be used as the pilot signal sequences.

In this case, there is the problem that the pilot signals for the users who perform pilot signals using different frequency blocks of continuous frequencies will not become orthogonal. The reason is that the sequence lengths of the pilot signals are not the same between the users who use different frequency blocks.

FIG. 6 is a diagram showing another configurational example of a conventional mobile radio system.

In the mobile radio system shown in FIG. 6, constituted of BS1001 and 1301 as base stations and CL1000 and CL1300 as service areas formed by BS1001 and BS1301, a plurality of mobile stations MS1002-1005 and MS1302-1305 for performing communications with BS1001 and BS1301 respectively are provided.

FIG. 7 is a diagram showing frequency blocks used by the users in CL1300 of the mobile radio system shown in FIG. 6 and one example of pilot signal sequences used by the individual users. Here, the frequency blocks used by the users in CL1000 and the pilot signal sequences used by the individual users are assumed to be the same as those shown in FIG. 5.

Remarking the frequency blocks used in adjacent cells, for example, MS1003, or MS1004, and MS1303 have the same bandwidth, so that it is possible to suppress inter-cell interference using difference CAZAC sequences. In contrast, for example, MS1002 and MS1302, or MS1002 and MS1304 use frequency blocks different in bandwidth, hence it is impossible to suppress inter-cell interference. In other words, when CAZAC sequences used as pilot signals are different in sequence length, there is the problem that inter-cell interference cannot be suppressed. The reason is that the mutual correction characteristics between CAZAC sequences different in sequence length degrade.

DISCLOSURE OF INVENTION

In order to solve the problems described above, it is an object of the present invention to provide a pilot signal transmission method and a radio communication apparatus in a mobile radio system, whereby when CAZAC sequences are transmitted as pilot signals and CDM is used as the user multiplexing method, the pilot signals of users different in bandwidth can be made orthogonal in a cell and inter-cell interference to pilot signals from another cell can be reduced.

In order to achieve the above object, the present invention is a pilot signal transmission method for use in a radio communication system, to transmit pilot signal sequences which at least have either the first property that the self-correlation value when the phase difference is other than zero is equal to or lower than a predetermined threshold relative to the peak self-correlation value when the phase different is zero, or the second property that the cross-correlation value between the sequences that are equal in sequence length is smaller than the cross-correlation value between the sequences that are different in sequence length, by using code division multiplexing as at least one of user multiplexing schemes, comprising the steps of:

dividing a system band as a frequency band usable in the system into a plurality of frequency blocks having plural kinds of bandwidths;

generating pilot signals of said plural frequency blocks with a single carrier, using said pilot signal sequences having sequence lengths corresponding to said plural frequency blocks; and, transmitting said generated pilot signals as the pilot signals corresponding individual users, with multicarriers using an arbitrary number of frequency blocks among said plurality of frequency blocks.

The present invention is also characterized by including the steps of:

diving the same band of all the neighboring cells into a plurality of frequency blocks having plural kinds of bandwidths; and using different sequences among said pilot signal sequences having said sequence lengths corresponding to the bandwidths of said plural frequency blocks, between different cells that transmit pilot signals through said frequency blocks.

The present invention is also characterized by including the step of dividing said system band into a plurality of frequency blocks having an identical bandwidth.

The present invention is also characterized in that CAZAC sequences are used as said pilot signal sequences.

The present invention is also characterized by including the step of transmitting a data signal or control signal with a single carrier using said frequency blocks having continuous frequencies.

Further, in a radio communication system, a radio transmission apparatus for transmitting signals by transmitting pilot signal sequences which at least have either the first property that the self-correlation value when the phase difference is other than zero is equal to or lower than a predetermined threshold relative to the peak self-correlation value when the phase different is zero, or the second property that the cross-correlation value between the sequences that are equal in sequence length is smaller than the cross-correlation value between the sequences that are different in sequence length, while using code division multiplexing as at least one of user multiplexing schemes, is characterized by generating said pilot signal sequences having sequence lengths corresponding to plural frequency blocks having plural kinds of bandwidths into which a system band as a frequency band usable in the system is divided, generating pilot signals using said generated pilot signal sequences, with a single carrier, transmitting said generated pilot signals as the pilot signals corresponding individual users, with multicarriers using an arbitrary number of frequency blocks among said plurality of frequency blocks.

The invention is also characterized in that said pilot signal sequences having an identical sequence length is generated.

The invention is also characterized in that CAZAC sequences are generated as said pilot signal sequences.

The invention is also characterized in that a data signal or control signal is transmitted with a single carrier using said frequency blocks having continuous frequencies.

In the present invention thus constructed as above, when pilot signal sequences which at least have either the first property that the self-correlation value when the phase difference is other than zero is equal to or lower than a predetermined threshold relative to the peak self-correlation value when the phase different is zero, or the second property that the cross-correlation value between the sequences that are equal in sequence length is smaller than the cross-correlation value between the sequences that are different in sequence length, are transmitted while using code division multiplexing as at least one of user multiplexing schemes, a system band as a frequency band usable in the system is divided into a plurality of frequency blocks having plural kinds of bandwidths; pilot signals of the plural frequency blocks are generated with a single carrier, using the pilot signal sequences having sequence lengths corresponding to the plural frequency blocks; and, the generated pilot signals are transmitted as the pilot signals corresponding individual users, with multicarriers using an arbitrary number of frequency blocks among the plurality of frequency blocks.

Accordingly, all the sequence lengths for the pilot signal sequences can be made identical, hence it is possible to select sequences having good cross-correlation characteristics.

As has been described, the present invention is constructed such that, when pilot signal sequences which at least have either the first property that the self-correlation value when the phase difference is other than zero is equal to or lower than a predetermined threshold relative to the peak self-correlation value when the phase different is zero, or the second property that the cross-correlation value between the sequences that are equal in sequence length is smaller than the cross-correlation value between the sequences that are different in sequence length, are transmitted while using code division multiplexing as at least one of user multiplexing schemes, a system band as a frequency band usable in the system is divided into a plurality of frequency blocks having plural kinds of bandwidths; pilot signals of the plural frequency blocks are generated with a single carrier, using the pilot signal sequences having sequence lengths corresponding to the plural frequency blocks; and, the generated pilot signals are transmitted as the pilot signals corresponding individual users, with multicarriers using an arbitrary number of frequency blocks among the plurality of frequency blocks. Accordingly, it is possible to make the pilot signals of different users in the band orthogonal to each other and reduce inter-cell interference of pilot signals from other cells.

BEST MODE FOR CARRYING OUT THE INVENTION

Next, the embodiment modes of the present invention will be described with reference to the drawings.

The First Embodiment Mode

Figure 1:
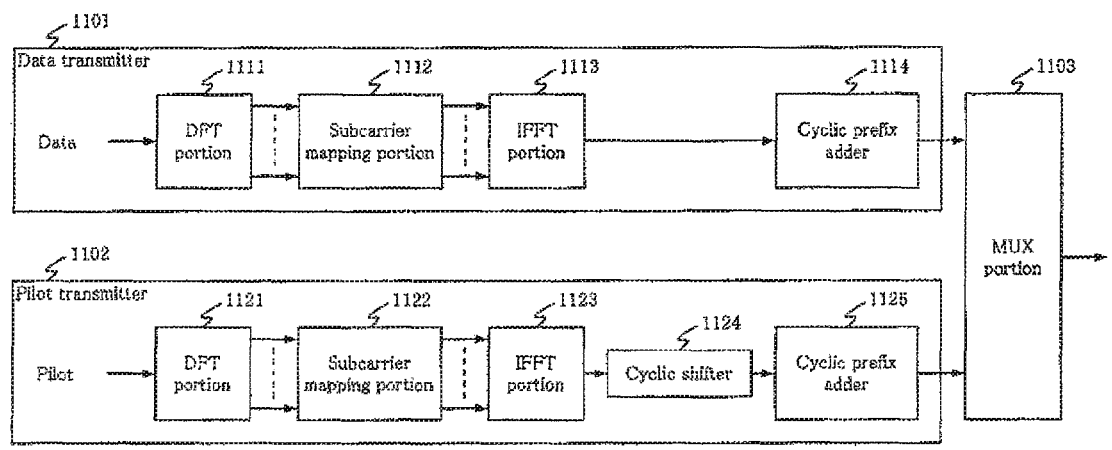
FIG. 1 is a diagram showing a configuration of a transmitter based on a single carrier transmission scheme shown in literature 1.
Figure 2:
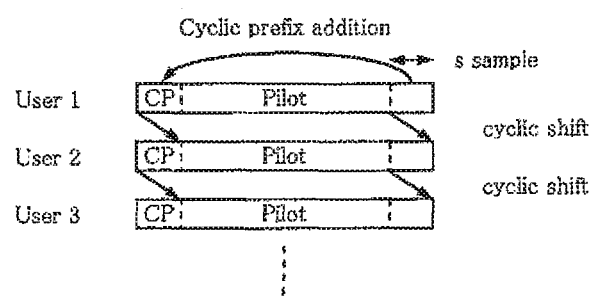
FIG. 2 is a diagram showing the manner in which cyclic prefix addition in the cyclic prefix adder shown in FIG. 1 is performed.
Figure 3:
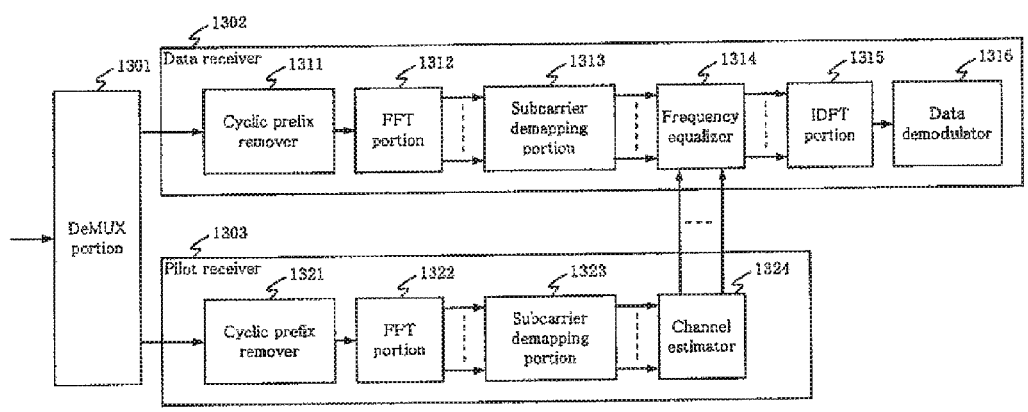
FIG. 3 is a diagram showing a configuration of a typical receiver that corresponds to the transmitter shown in FIG. 1.
Figure 4:
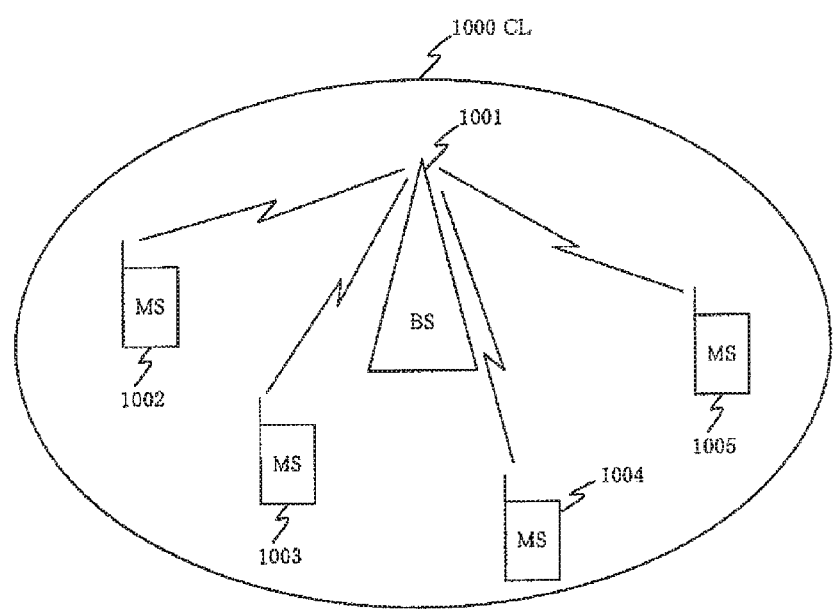
FIG. 4 is a diagram showing a configurational example of a conventional mobile radio system.
Figure 5:
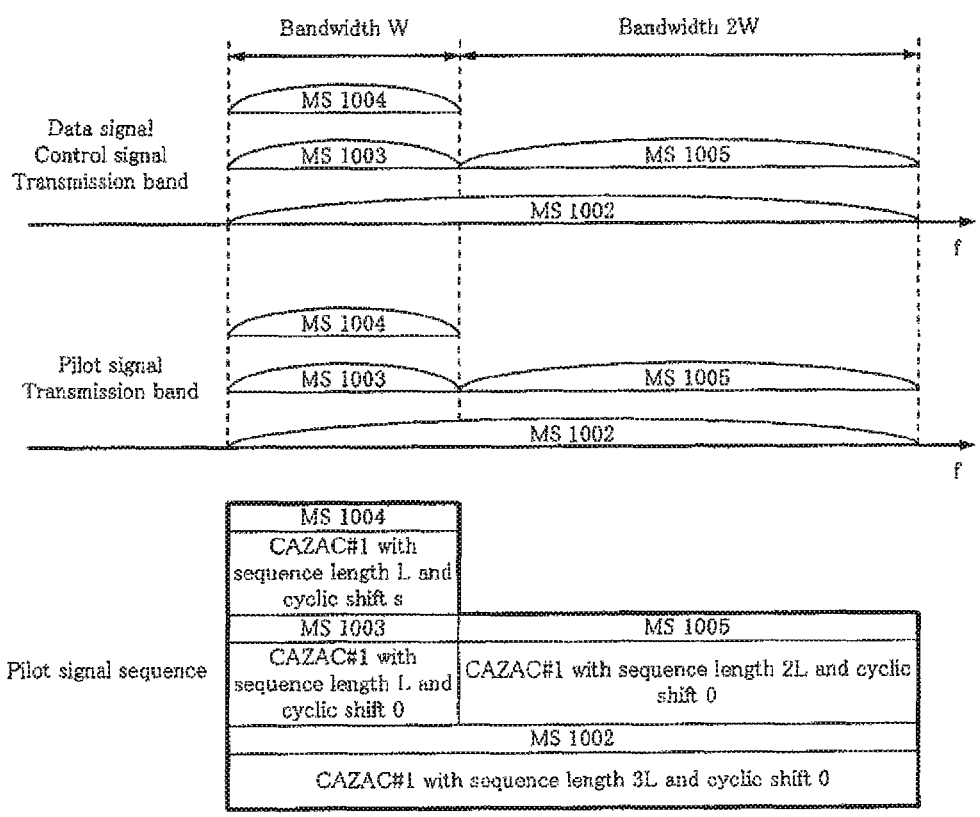
FIG. 5 is a diagram showing one example of frequency blocks used by users and pilot signal sequences used by individual users in the mobile radio system shown in FIG. 4.
Figure 6:
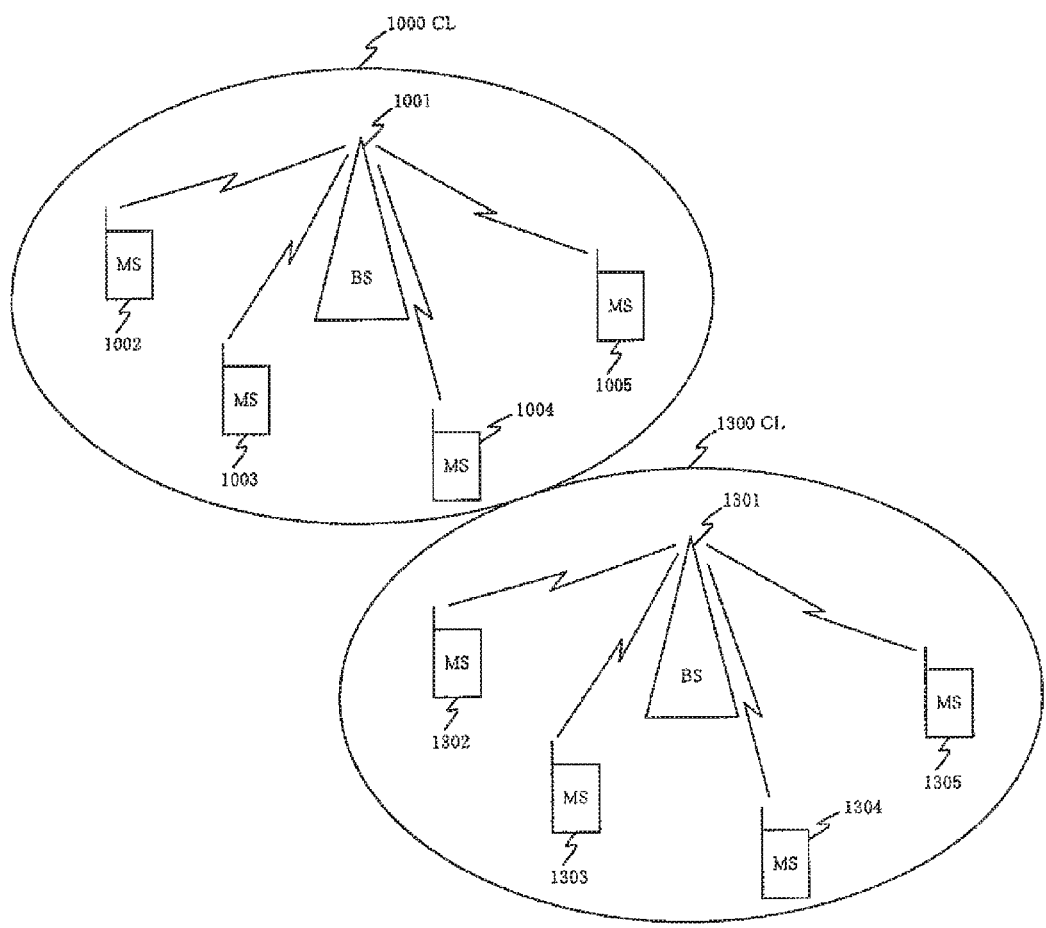
FIG. 6 is a diagram showing another configurational example of a conventional mobile radio system.
Figure 7:
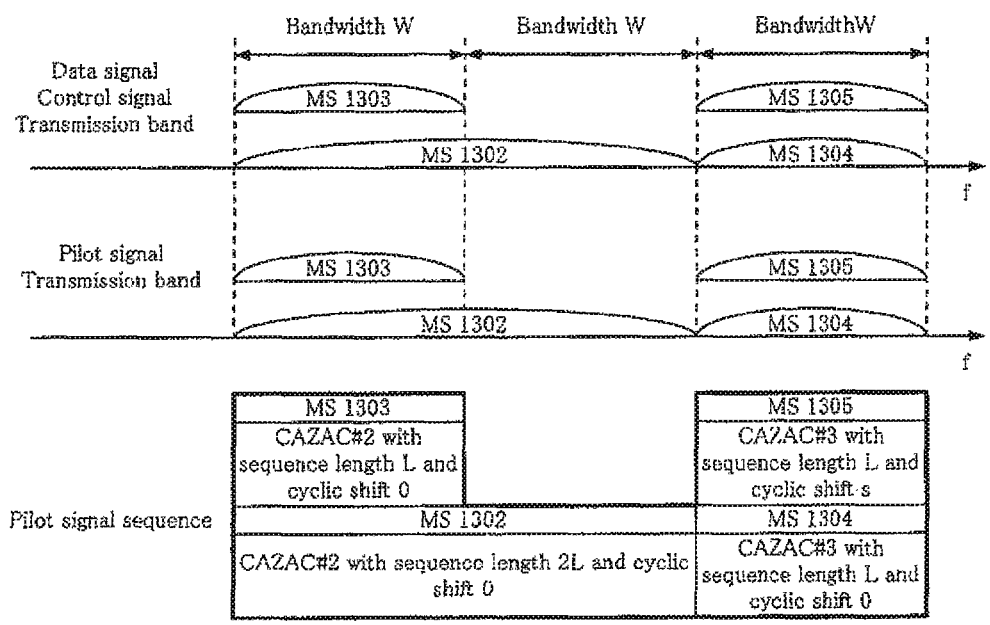
FIG. 7 is a diagram showing one example of frequency blocks used by users and pilot signal sequences used by individual users in the CL of the mobile radio system shown in FIG. 6.
Figure 8:
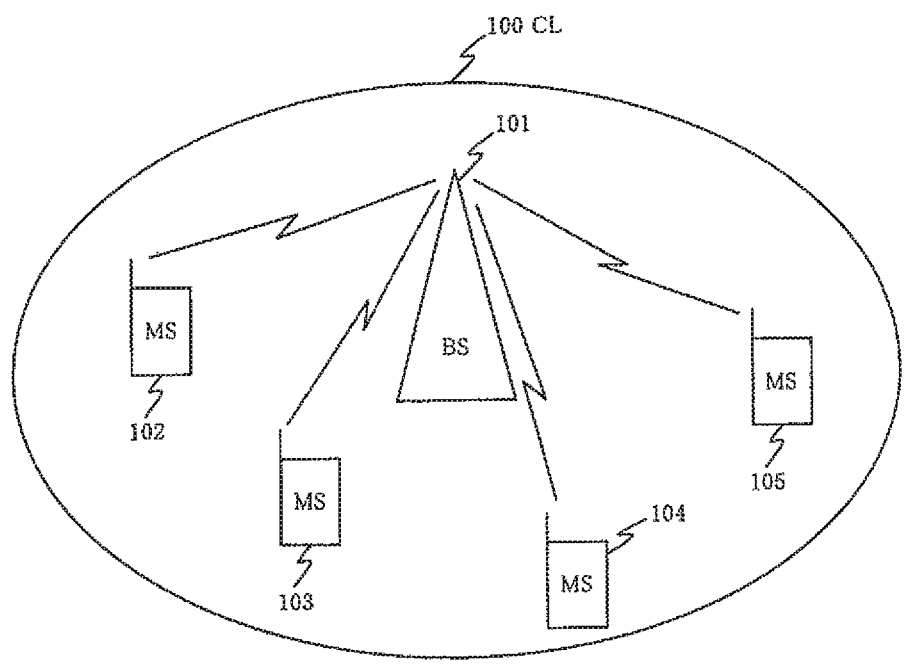
FIG. 8 is a diagram showing the first embodiment mode of a mobile radio system in which a radio communication apparatus of the present invention is used.

FIG. 8 is a diagram showing the first embodiment mode of a mobile radio system in which a radio communication apparatus of the present invention is used.

As shown in FIG. 8, in this mode, in BS101 as a base station and a plurality of mobile stations MS102-105 for performing communications with BS101 in CL100 as a service area formed by BS101 are provided. Here, BS101 and MS102-105 are the radio communication apparatus of the present invention.

Figure 9:
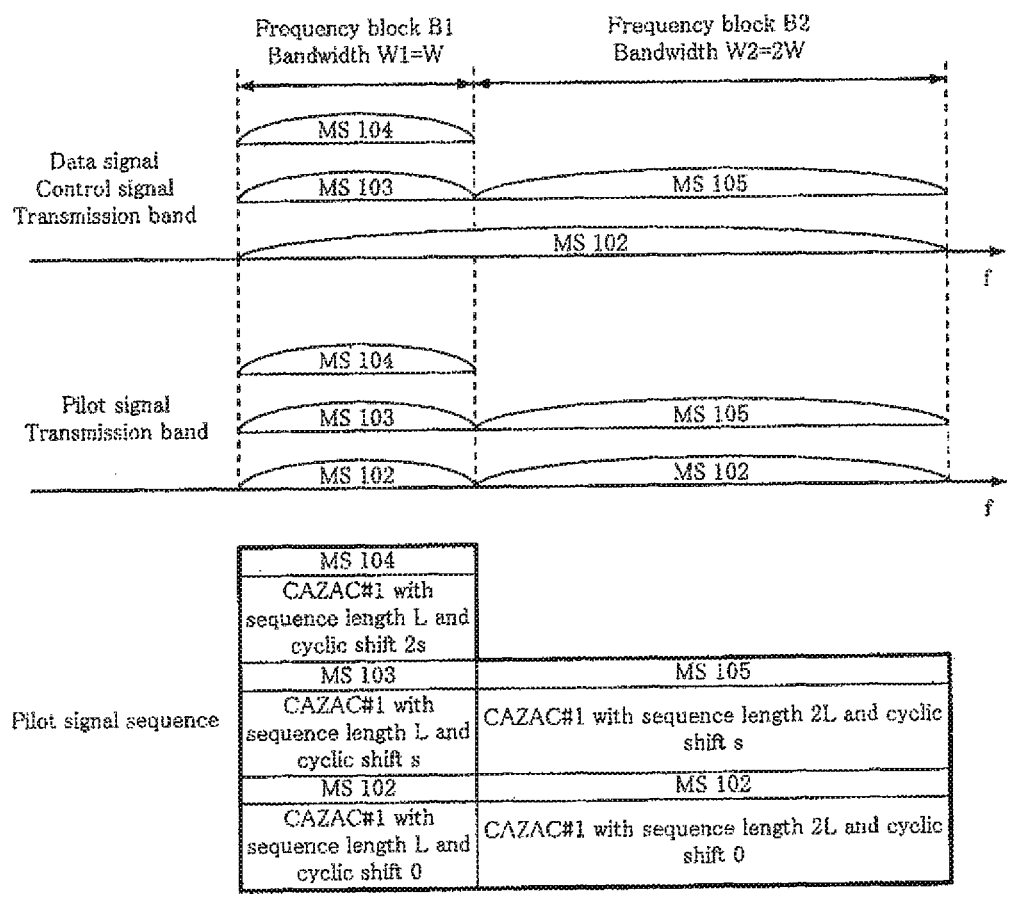
FIG. 9 is a diagram showing bands through which individual users transmit pilot signals and CAZAC sequences used thereupon in the mobile radio system shown in FIG. 8.

FIG. 9 is a diagram showing bands through which individual users transmit pilot signals and CAZAC sequences used thereupon in the mobile radio system shown in FIG. 8.

As shown in FIG. 9, the system band as the frequency band that is usable in the system is divided into frequency blocks B1 and B2. It is also assumed that every user uses a different band to transmit the data signal or control signal with a single carrier. In this case, all the users use identical CAZAC sequences having a sequence length of L1 or L2 corresponding to the frequency block bandwidth W1=W or W2=2.

Accordingly, MS102 performs simultaneous multi-carrier transmission by using two frequency blocks B1 and B2 corresponding to CAZAC sequence lengths L1=I and L1=2 L. MS103 and MS104 perform single carrier transmission using bandwidth W1 corresponding to CAZAC sequence length L1=L. MS105 performs single carrier transmission using bandwidth W2 corresponding to CAZAC sequence length L2=2 L. Here, the users that perform transmission through the same band use identical CAZAC sequences that are cyclically shifted by a phase unique to each user.

In this way, by unifying the bandwidth of the frequency blocks of pilot signals or by unifying CAZAC sequence length to be used, it is possible to make the users having pilot signals of different transmission bands orthogonal to each other.

Figure 10:
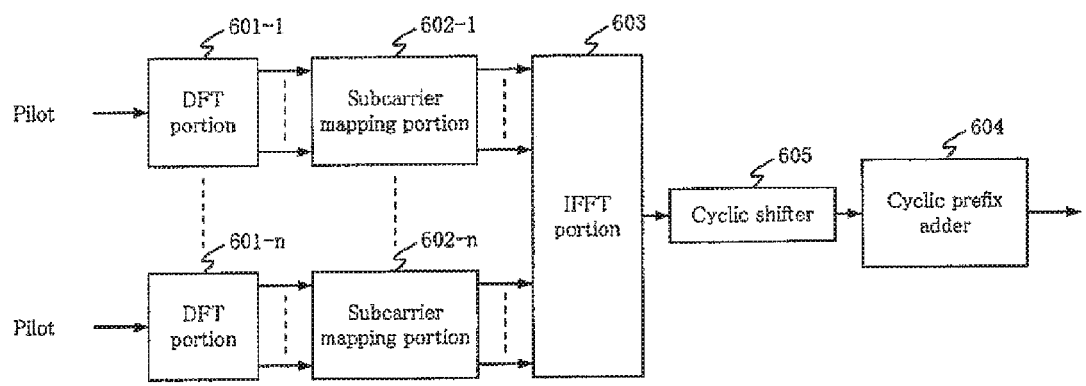
FIG. 10 is a diagram showing one configurational example of a pilot signal transmitter according to the first embodiment mode of a radio communication apparatus of the present invention.

FIG. 10 is a diagram showing one configurational example of a pilot signal transmitter according to the first embodiment mode of a radio communication apparatus of the present invention.

As shown in FIG. 10, this configuration is composed of a plurality of DFT portions 601-1 to 601-$n$, a plurality of subcarrier mapping portions 602-1 to 602-$n$, IFFT portion 603, cyclic prefix adder 604 and cyclic shifter 605.

The pilot signal transmitter shown in FIG. 10 operates as follows.

First, CAZAC sequences having sequence lengths corresponding to the bandwidth of frequency blocks are inserted to DFT portions 601-1 to 601-$n$, whereby they are transformed into frequency-domain pilot signals. Here, the number of points of DFT portions 601-1 to 601-$n$, $$N_{Tx\_p\_1} \sim N_{Tx\_p\_n} \qquad \text{[Math 12]}$$

correspond to the sequence lengths corresponding to bandwidths of respective carriers. Here, $n(n=1$ to N) is the number of carries to be transmitted simultaneously.

Then, the frequency-transformed pilot signals are inserted to subcarrier mapping portions 602-1 to 602-$n$, whereby they are subcarrier mapped. After sub-carrier mapping, the sub-carrier mapped frequency-domain pilot signals are supplied to IFFT portion 603, where they are subjected to FFT at points $$N_{FFT\_p}$$ [Math 13]

so as to be transformed into time-domain pilot signals.

Thereafter, in cyclic shifter 605, a cyclic shift unique to the user is performed and a cyclic prefix is added in cyclic prefix adder 604.

The thus generated pilot signals are time multiplexed over the data signal generated by the same process as in the conventional example.

The process described heretofore is the process on the transmitter side in the pilot signal transmission method of the present invention.

Figure 11:
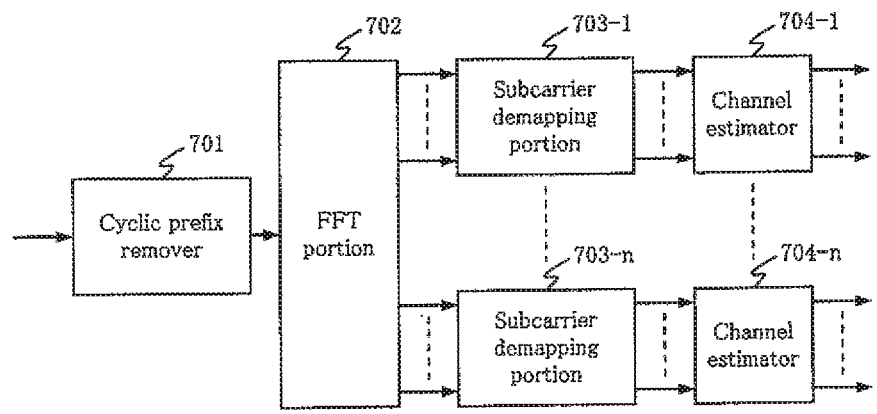
FIG. 11 is a diagram showing one configurational example of a pilot signal receiver that corresponds to the pilot signal transmitter shown in FIG. 10.

FIG. 11 a diagram showing one configurational example of a pilot signal receiver that corresponds to the pilot signal transmitter shown in FIG. 10. Here, the receiver of the data has the same configuration as the conventional one, hence only the receiver of the pilot signal after the pilot signal has been separated from the data signal by a multiplexer will be shown in FIG. 11.

The pilot signal receiver shown in FIG. 11 includes cyclic prefix remover 701, FFT portion 702, a plurality of subcarrier demapping portions 703-1 to 703-n and a plurality of channel estimators 704-1 to 704-n.

The pilot signal receiver shown in FIG. 11 operates as follows.

First, the cyclic prefix is removed from the received signal in cyclic prefix remover 701. Then, the resultant signal is subjected to FFT at $$N_{FFT\_p}$$ [Math 14]

points, by FFT portion 702 to be transformed into the received signal in the frequency domain. Thereafter, the signal is demapped to subcarriers used by the individual user by subcarrier demapping portions 703-1 to 703-n. After subcarrier demapping, the subcarrier-demapped frequency signals are inserted into channel estimators 704-1 to 704-n.

Figure 12:
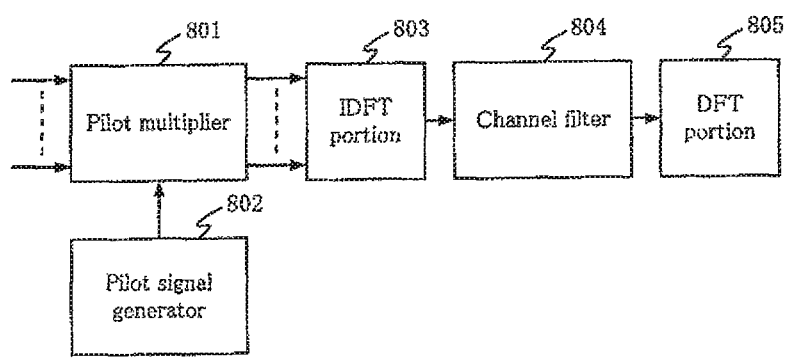
FIG. 12 is a diagram showing one configurational example of the channel estimators shown in FIG. 11.

FIG. 12 is a diagram showing one configurational example of channel estimators 704-1 to 704-n shown in FIG. 11.

As shown in FIG. 12, channel estimators 704-1 to 704-n shown in FIG. 11 each include pilot multiplier 801, pilot signal generator 802, IDFT portion 803, channel filter 804 and DFT portion 805.

In pilot multiplier 801, the subcarrier demapped, frequency-domain received signal is multiplied with the complex conjugate of the pilot signal in frequency-domain representation, generated by pilot signal generator 802. Pilot signal generator 802 may be a memory that memorizes the pilot signal in frequency representation or a circuit that calculates based on a generation formula.

Then, the multiplied signal is processed by IDFT portion 803 where it is subjected to IDFT at points $$N_{Tx\_p\_n}$$ [Math 15]

that corresponds to the bandwidth of the frequency block, so as to be transformed into the time-domain signal.

Figure 13:
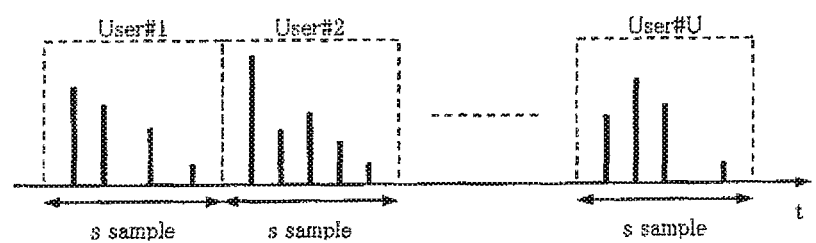
FIG. 13 is a diagram showing an example of a time-domain signal obtained from the IDFT portion shown in FIG. 12.

FIG. 13 is a diagram showing an example of a time-domain signal obtained from IDFT portion 803 shown in FIG. 12.

As shown in FIG. 13, the signal which the impulse responses to the channels for different users shifted with respect to time, by performing cyclic shifts unique to users in cyclic shifter 605 shown in FIG. 10.

The thus obtained impulse responses to the channels are passed through channel filter 804, so that the impulse response to the channel corresponding to each user is obtained. The obtained impulse response of each user is processed through DFT portion 805 so that it is subjected to DFT at points $$N_{Tx\_p\_n},$$ [Math 16]

so as to be transformed into the channel estimate in the frequency domain, which provides frequency response to the channel used for frequency equalization.

The above-described process is the process on the receiver side in the pilot signal transmission method of the present invention.

The first embodiment mode of the present invention was described by taking a case in which CAZAC sequences are transmitted as the pilot signal sequences while code division multiplexing is used as the user multiplexing method. In this case, the system band is divided into frequency blocks, and pilot signals are generated on a single carrier using the sequences that are obtained by cyclically shifting an identical pilot signal sequence having a sequence length corresponding to the bandwidth of each frequency block, and the pilot signals corresponding to each user are constructed so as to be transmitted with n multicarriers using arbitrary n frequency blocks of the frequency blocks. Accordingly, since CAZAC sequences of the same sequence length can be used for different users in the same band, it is possible to make the user pilot signals orthogonal to each other.

The Second Embodiment

Figure 14:
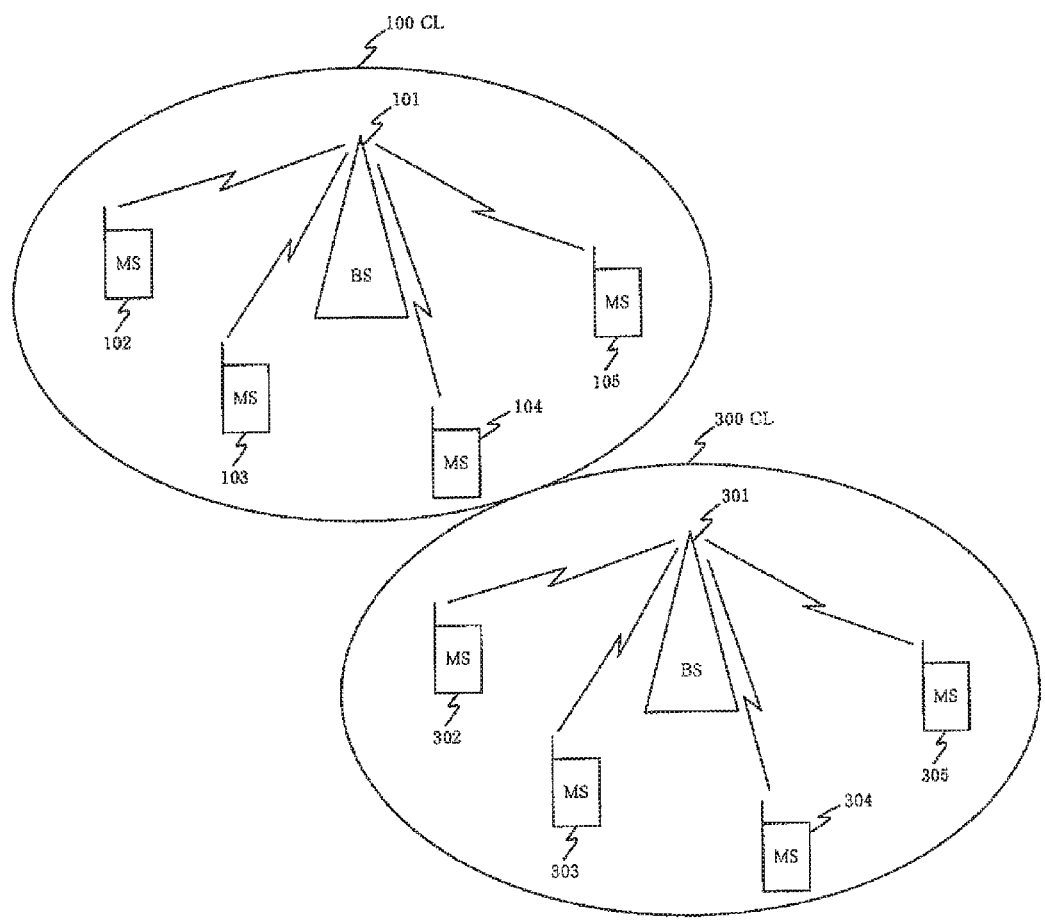
FIG. 14 is a diagram showing the second embodiment mode of a mobile radio system in which a radio communication apparatus of the present invention is used.

FIG. 14 is a diagram showing the second embodiment mode of a mobile radio system in which a radio communication apparatus of the present invention is used.

As shown in FIG. 14, in this mode, in BS101 and BS301 as base stations and a plurality of mobile stations MS102-105 and MS302-305 for performing communications with BS101 and BS301 respectively in CL100 and CL300 as service areas formed respectively by BS101 and BS301 are provided. Here, BS101, 301, MS102-105 and 302-305 are the radio communication apparatus of the present invention.

Figure 15:
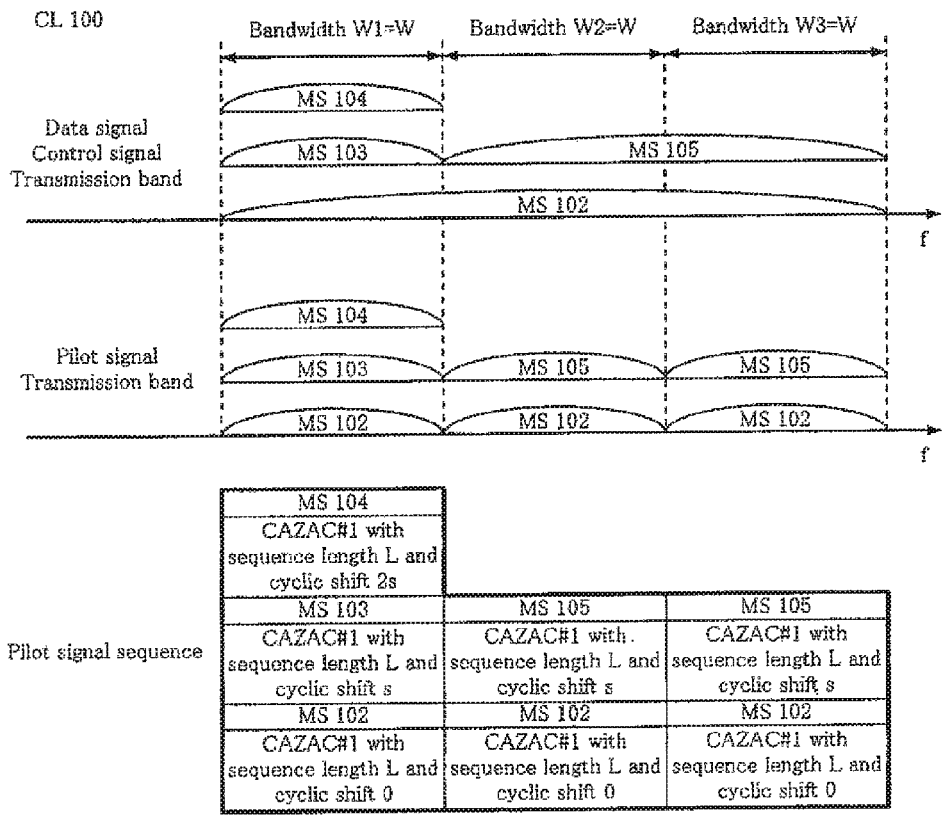
FIG. 15 is a diagram showing bands through which individual users transmit pilot signals and CAZAC sequences used thereupon in the mobile radio system shown in FIG. 14.
Figure 15:
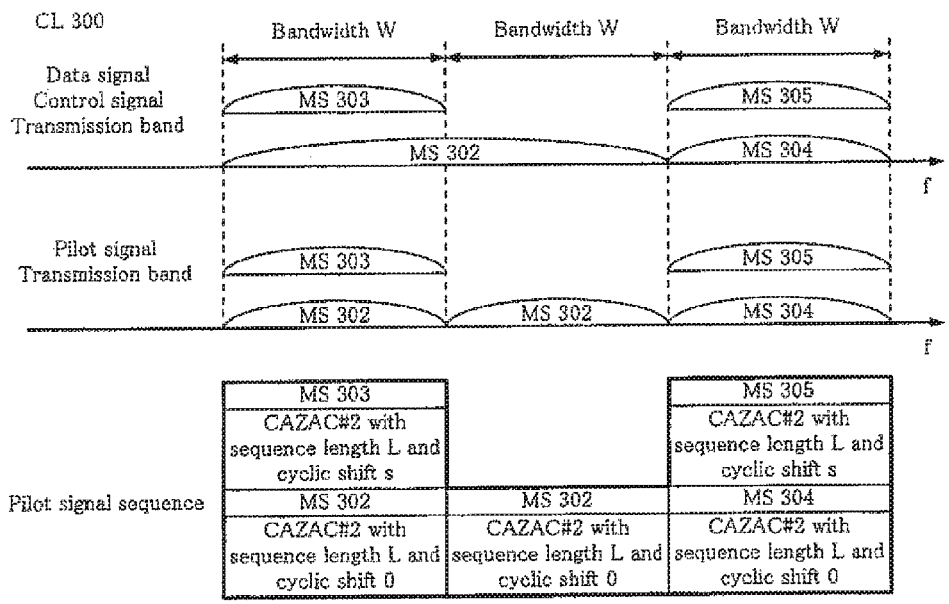

FIG. 15 is a diagram showing bands through which individual users transmit pilot signals and CAZAC sequences used thereupon in the mobile radio system shown in FIG. 14. Here, similarly to the conventional configuration, it is assumed that data signal or control signal is transmitted with a single carrier using frequency blocks having continuous frequencies.

In the first embodiment mode, the bands through which individual users transmit their pilot signals by single carriers, are unified. In the second embodiment mode, the bands through which pilot signals are transmitted by single carriers are unified, inclusive of the users in another cell.

Accordingly, referring to FIG. 15, MS102 of CL100 performs multi-carrier transmission by simultaneously transmitting three carriers (bandwidth W1=W2=W3=W) corresponding to CAZAC sequence lengths L1=L2=L3=L. MS103 and MS104 perform single carrier transmission using bandwidth W1 corresponding to CAZAC sequence length L1=L. MS105 performs multi-carrier transmission by simultaneously transmitting two carriers (bandwidth W2=W3=W) corresponding to CAZAC sequence lengths L2=L3=L.

On the other hand, MS302 of CL300 performs multi-carrier transmission by simultaneously transmitting two carriers (bandwidth W1=W2=W) corresponding to CAZAC sequence lengths L1=L2=L. MS303 performs single carrier transmission using bandwidth W1 corresponding to CAZAC sequence length L1=L. MS304 and MS305 perform single carrier transmission using bandwidth W3 corresponding to CAZAC sequence length L3=L.

As the sequences used for the pilot signals, in the same band inside the cell, the sequences that are obtained by cyclically shifting an identical CAZAC sequence by the phases unique to the users are used while in the same band of a different cell, a different CAZAC sequence is used. Since CAZAC sequences have the properties that only when sequences have the same length, there exist sequences that produce a low cross-correlation function, it is possible to unify the bandwidth of the frequency block of pilot signals in the same band of all the cells. That is, when the sequence lengths of CAZAC sequences are unified, it is possible to reduce inter-cell interference.

The pilot signal transmitter and receiver of the second embodiment mode have the same configurations as those in FIGS. 10 to 12 described in the first embodiment mode, description will be omitted.

In the second embodiment mode of the present invention, the same band of neighboring cells for neighboring service areas are divided into the same frequency blocks. The users of the different cells that transmit pilot signals through a divided frequency block, use different CAZAC sequences among the CAZAC sequences having a sequence length corresponding to the bandwidth of the frequency block to generate pilot signals with a single carrier. The pilot signal corresponding to each user is transmitted with n multicarriers using arbitrary n frequency blocks among the frequency blocks. Accordingly, in the same band of the users in the cell and different cell, CAZAC sequences having the same sequence length can be used. As a result, it is possible to make the pilot signals inside the cell orthogonal to each other and reduce inter-cell interference.

Though the second embodiment mode was described taking a case where the same CAZAC sequence is used inside the cell for the different bands in the cell, the same effect can also be expected if different CAZAC sequences are used.

Further, though the second embodiment mode of the present invention was described taking a case where there are two service cells for service areas, it goes without saying that the same effect can also be expected in a case where there are three or more service cells.

Also, though the second embodiment mode was described taking a case where the neighboring service cells have the same system band, even when the system bands of the neighboring service cells are different from each other, the same effect can also be expected if the same band is divided into frequency blocks in the same manner.

Also, though the embodiment mode of the present invention was explained taking a case where frequency blocks have different bandwidths (W1#W2), the same effect can be obtained when the bandwidths of frequency blocks are equal to each other (W1=W2).

Also, though the embodiment mode of the present invention was described taking a case where the system band is divided into three frequency blocks, the same effect can also be expected when there are two or more frequency blocks.

Also, though the embodiment mode of the present invention was described taking a case where the frequency blocks through which pilot signals are transmitted is constituted of bandwidth W and its integer multiples, the same effect can also be expected when frequency blocks not having the integer multiple of bandwidth W are included.

Also, though the embodiment mode of the present invention was described taking a case where the pilot signal of each user is transmitted with multicarriers using frequency blocks whose frequencies are continuous, the same effect can also be expected when the pilot signal is transmitted with multicarriers using frequency blocks whose frequencies are discontinuous.

Also, in the above description, BS101, 301 and MS102-105 and 302-305 were described as radio communication apparatus including the above-described pilot signal transmitter and pilot signal receiver to transmit signals.

Further, the above first and second embodiment modes were described taking examples in which CAZAC sequences are used as the pilot signal sequences. A pilot signal sequence may be used, which at least has either the first property that the self-correlation value when the phase difference is other than zero, is equal to or lower than a predetermined threshold relative to the peak self-correlation value when the phase difference is zero, or the second property that the cross-correlation value between the sequences that are equal in sequence length is smaller than the cross-correlation value between the sequences that are different in sequence length. In this case, when the data signal to be demodulated has a low operational point (Eb/N0=0 to 5 dB) such as QPSK for example, if the threshold for the self-correlation value when the phase difference is other than zero is −20 dB (10%) relative to the self-correlation peak when the phase difference is zero, no degradation in characteristics will occur. However, when the data signal to be demodulated has a high operational point such as 16QAM and 64QAM, the threshold of the self-correlation value needs to be set at a further lower level.

What is claimed is:

1. A base station comprising:
   a receiver configured to receive, from a user equipment, a first reference signal including a first sequence having a first sequence length corresponding to a first bandwidth assigned for a first single carrier data transmission and a second reference signal including a second sequence having a second sequence length corresponding to a second bandwidth assigned for a second single carrier data transmission; and
   a demodulator configured to demodulate a data signal of the first single carrier data transmission by using the received first reference signal and a data signal of the second single carrier data transmission by using the received second reference signal.

2. The base station in accordance with claim 1, wherein the receiver receives data signals using three or more bandwidths including the first bandwidth and the second bandwidth.

3. The base station in accordance with claim 1, wherein, the receiver receives data signals using a multi-carrier transmission of a first single carrier data transmission of the first bandwidth and a second single carrier data transmission of the second bandwidth.

4. The base station in accordance with claim 1 wherein, the first bandwidth equals the second bandwidth.

5. The base station in accordance with claim 1 wherein, the first bandwidth is different from the second bandwidth.

6. The base station in accordance with claim 1 wherein, at least one of the first sequence and the second sequence is a CAZAC sequence or a cyclic shifted CAZAC sequence.

7. A communication method by a base station comprising:
   receiving, from a user equipment, a first reference signal including a first sequence having a first sequence length corresponding to a first bandwidth assigned for a first single carrier data transmission and a second reference signal including a second sequence having a second sequence length corresponding to a second bandwidth assigned for a second single carrier data transmission, by a receiver implemented in the base station; and
demodulating, by a demodulator implemented in the base station, a data signal of the first single carrier data transmission by using the received first reference signal and a data signal of the second single carrier data transmission by using the received second reference signal.

8. The communication method in accordance with claim 7, wherein receiving data signals using three or more bandwidths including the first bandwidth and the second bandwidth.

9. The communication method in accordance with claim 7, wherein, receiving data signals using a multi-carrier transmission of a first single carrier transmission of the first bandwidth and a second single carrier transmission of the second bandwidth.

10. The communication method in accordance with claim 7, wherein, the first bandwidth equals the second bandwidth.

11. The communication method in accordance with claim 7, the first bandwidth is different from the second bandwidth.

12. The communication method in accordance with claim 7, wherein, at least one of the first sequence and the second sequence is a CAZAC sequence or a cyclic shifted CAZAC sequence.

* * * * *

UNITED STATES PATENT AND TRADEMARK OFFICE
CERTIFICATE OF CORRECTION

PATENT NO. : 9,735,938 B2
APPLICATION NO. : 15/075346
DATED : August 15, 2017
INVENTOR(S) : Takamichi Inoue and Yoshikazu Kakura It is certified that error appears in the above-identified patent and that said Letters Patent is hereby corrected as shown below:

In the Specification

Column 11, Line 55:
"(W1#W2)," has been replaced with --(W1≠W2),--

Signed and Sealed this
Twenty-second Day of May, 2018

Andrei Iancu
*Director of the United States Patent and Trademark Office*